United States Patent
Shearin et al.

(10) Patent No.: US 9,064,395 B2
(45) Date of Patent: Jun. 23, 2015

(54) BEZEL WITH NON-METALLIC MATERIALS FOR COVER OR PLATTER FOR A DATA READER IN A CHECKOUT STATION

(71) Applicant: Datalogic ADC, Inc., Eugene, OR (US)

(72) Inventors: Alan Shearin, Eugene, OR (US); Ryan B. Thompson, Eugene, OR (US); David Newman, Eugene, OR (US); Jeff T. Robson, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 125 days.

(21) Appl. No.: 13/913,034

(22) Filed: Jun. 7, 2013

(65) Prior Publication Data

US 2013/0328682 A1  Dec. 12, 2013

Related U.S. Application Data

(60) Provisional application No. 61/657,732, filed on Jun. 8, 2012.

(51) Int. Cl.
 G08B 21/00 (2006.01)
 G08B 13/24 (2006.01)
 G06K 7/10 (2006.01)
(52) U.S. Cl.
 CPC .......... *G08B 13/246* (2013.01); *G06K 7/10821* (2013.01); *G06K 7/1096* (2013.01)
(58) Field of Classification Search
 USPC .......... 340/572.1, 572.3; 235/462.13, 462.43, 235/454, 470
 See application file for complete search history.

(56) References Cited

U.S. PATENT DOCUMENTS

| | | | |
|---|---|---|---|
| 4,510,489 | A | 4/1985 | Anderson, III et al. |
| 4,794,240 | A | 12/1988 | Jensen et al. |
| 5,005,329 | A | 4/1991 | Schorr |
| 5,170,045 | A | 12/1992 | Bengtsson |
| 5,341,125 | A | 8/1994 | Plonsky et al. |
| 5,446,271 | A | 8/1995 | Cherry et al. |
| 5,493,108 | A | 2/1996 | Cherry et al. |

(Continued)

FOREIGN PATENT DOCUMENTS

JP  06-208640  7/1994

OTHER PUBLICATIONS

Metrologic MS2xxx Series Stratos$^R$ Product Guide: 6-Sided, Bi-optic, High-Speed, Hi-Volume, In-Counter Laser Bar Code Scanners (Jul. 2004).

(Continued)

*Primary Examiner* — Jeffery Hofsass
(74) *Attorney, Agent, or Firm* — Stoel Rives LLP

(57) ABSTRACT

A checkout station includes an optional scale for weighing items; a composite cover or weigh platter supported by the scale, wherein the cover has a lower surface with a lower window having a horizontal perimeter, an upper surface including an upper window positioned transversely to the lower surface, a metallic plate surrounding a portion of the horizontal perimeter of the lower window, the metallic plate spaced apart proximal end sections, and a nonmetallic bezel positioned between the lower window and the upper surface and positioned between the spaced apart proximal end sections of the metallic plate; one or more imagers for obtaining views of an item within a viewing volume bounded by the lower and upper surfaces; and a surveillance tag deactivation system for deactivating an electronic surveillance tag in proximity to the viewing volume.

27 Claims, 8 Drawing Sheets

(56) References Cited

U.S. PATENT DOCUMENTS

| | | |
|---|---|---|
| 5,525,262 A | 6/1996 | Castellucci et al. |
| 5,917,412 A | 6/1999 | Martin |
| 6,899,272 B2 | 5/2005 | Krichever et al. |
| 7,234,641 B2 | 6/2007 | Olmstead |
| RE40,071 E | 2/2008 | Svetal et al. |
| 7,374,092 B2 | 5/2008 | Acosta et al. |
| 7,495,546 B2 | 2/2009 | Lintell |
| 7,619,527 B2 | 11/2009 | Friend et al. |
| 8,261,990 B2 | 9/2012 | Olmstead |
| 8,430,318 B2 | 4/2013 | McQueen et al. |
| 2007/0063045 A1 | 3/2007 | Acosta et al. |
| 2007/0210922 A1 | 9/2007 | Clifford et al. |
| 2007/0297021 A1 | 12/2007 | Smith |

OTHER PUBLICATIONS

International Search Report and Written Opinion of International Searching Authority, International Application No. PCT/US2013/044775, Nov. 26, 2013.

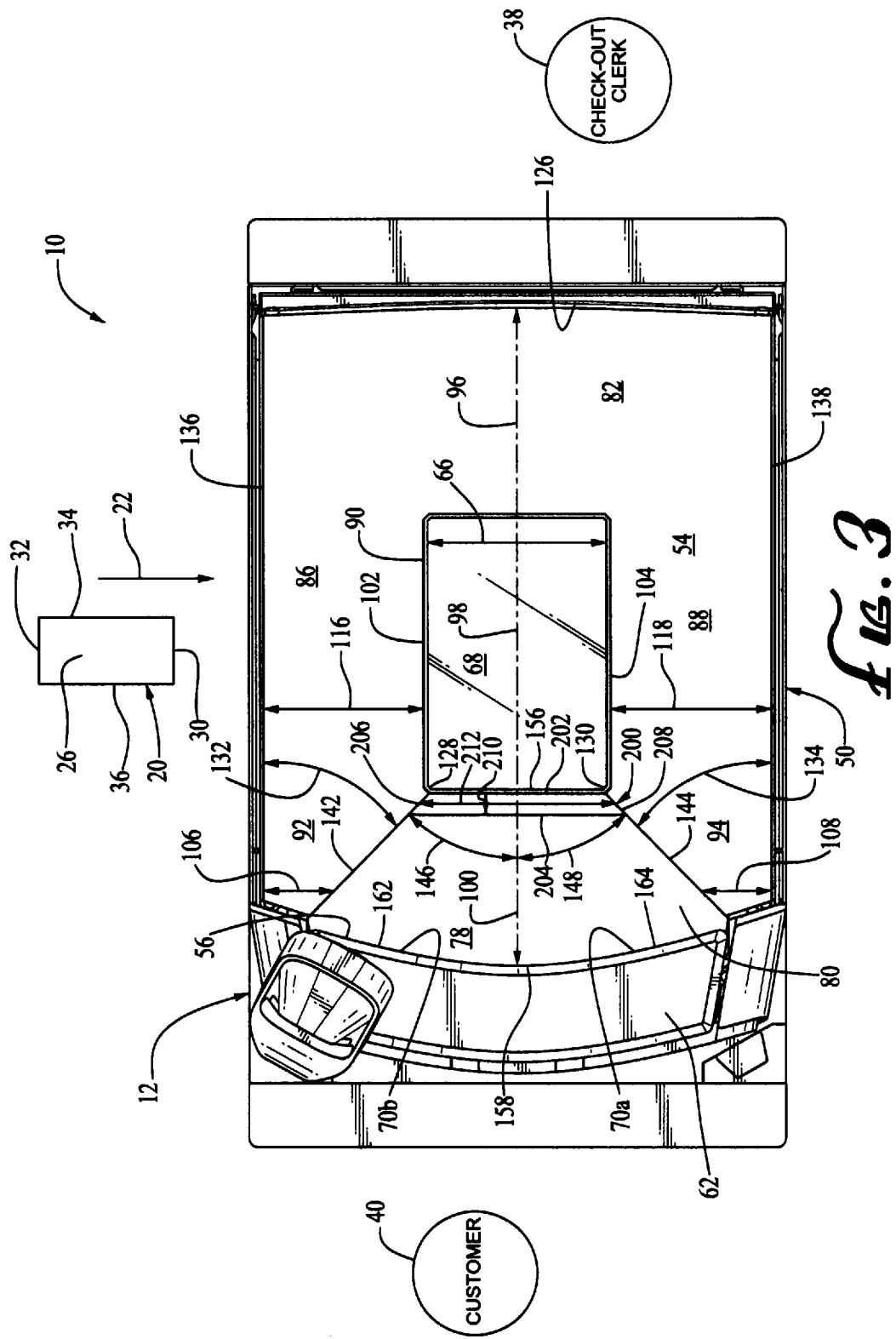

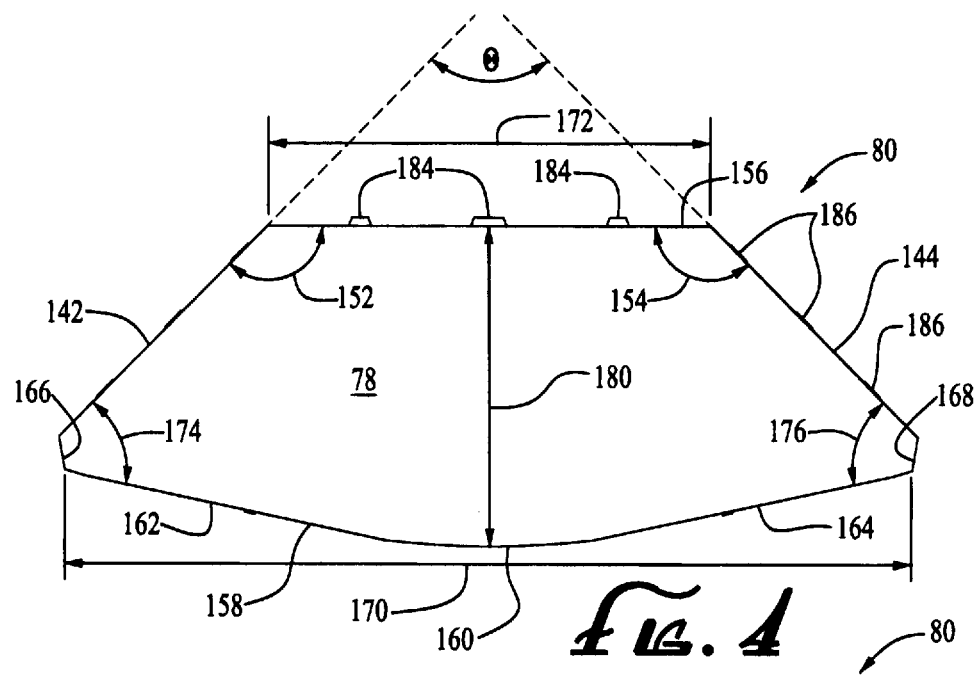
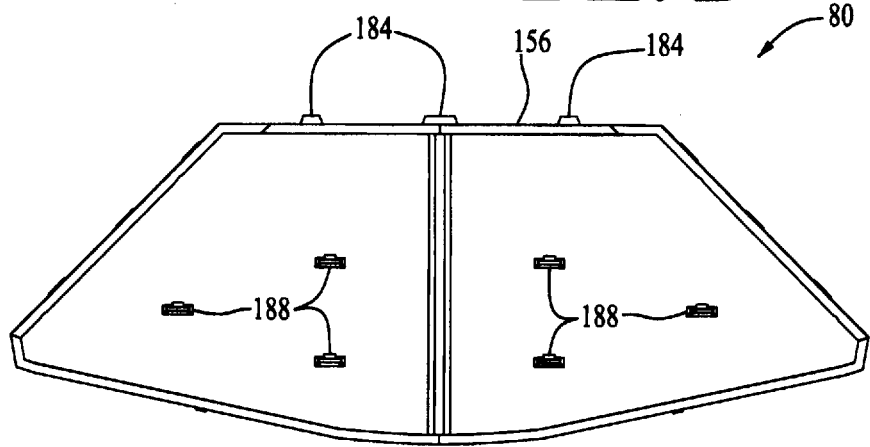
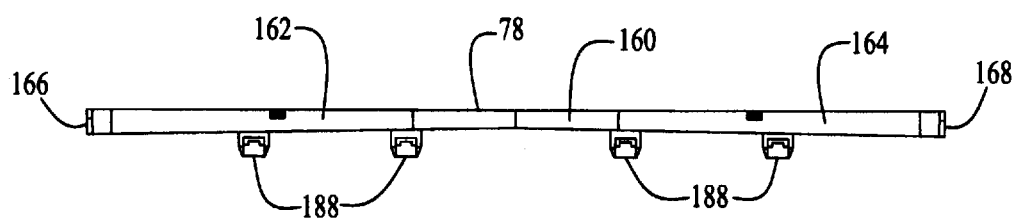

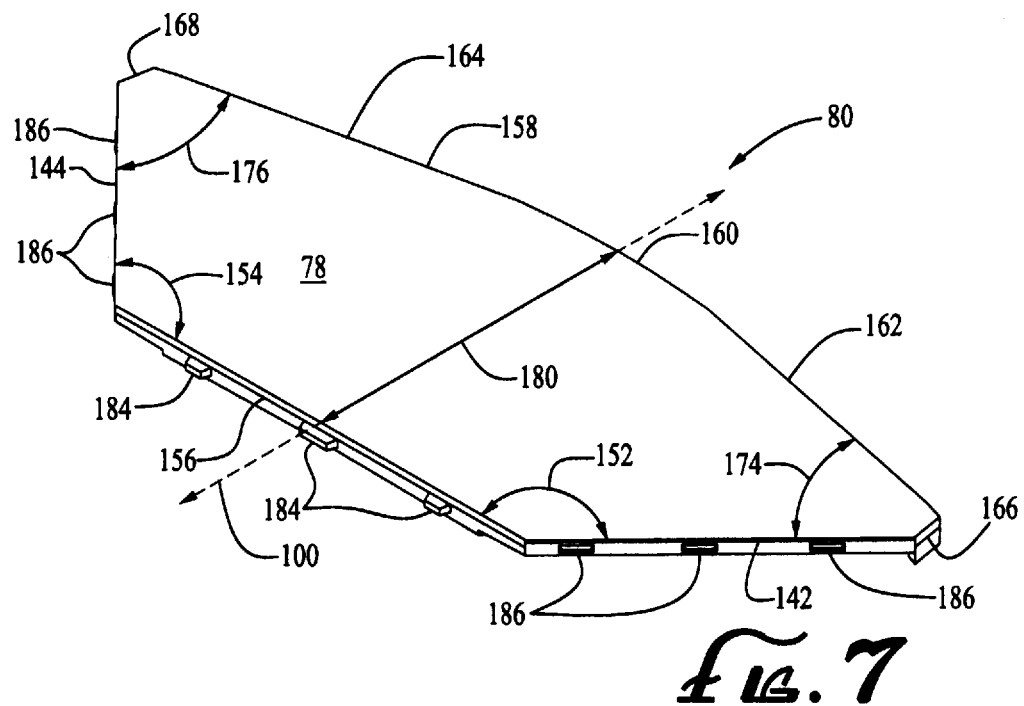
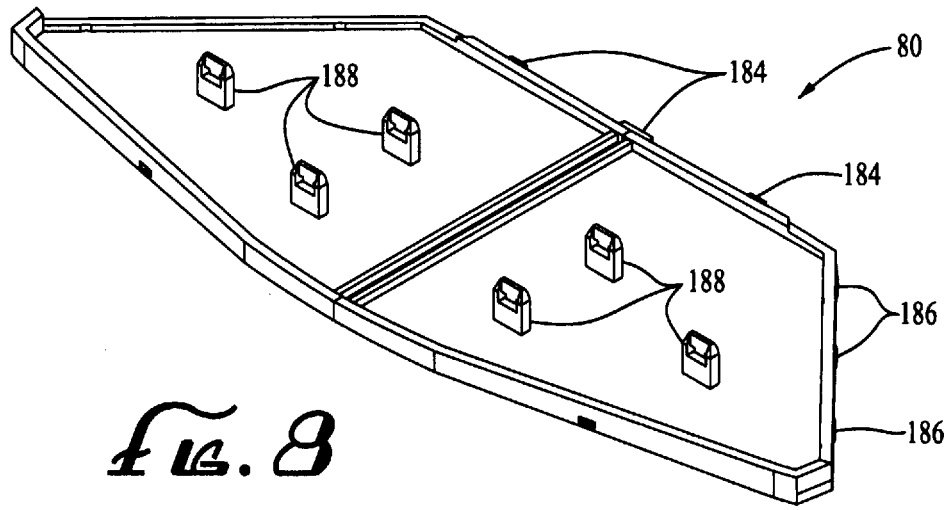

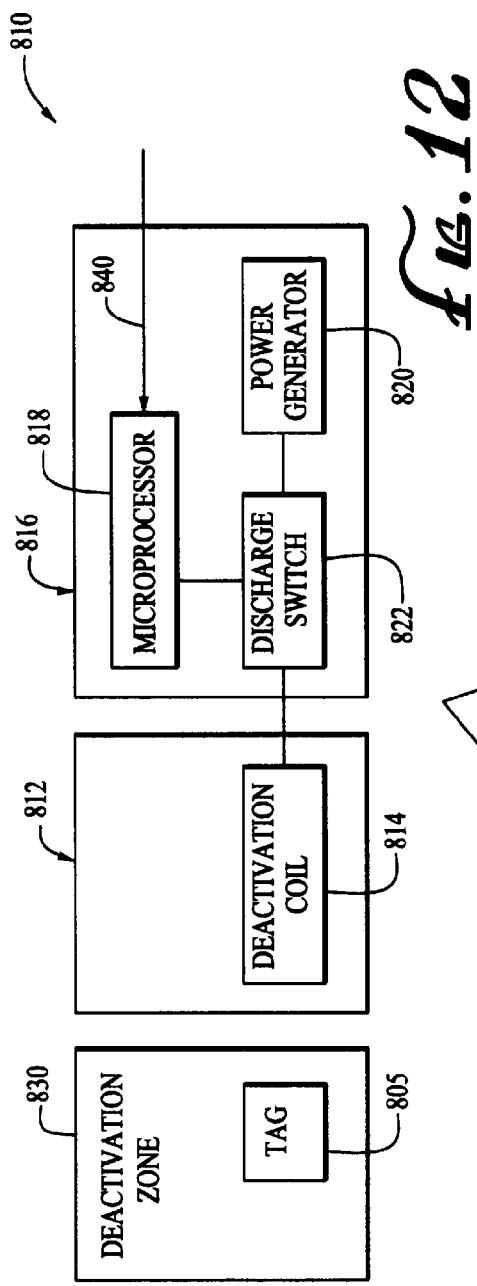
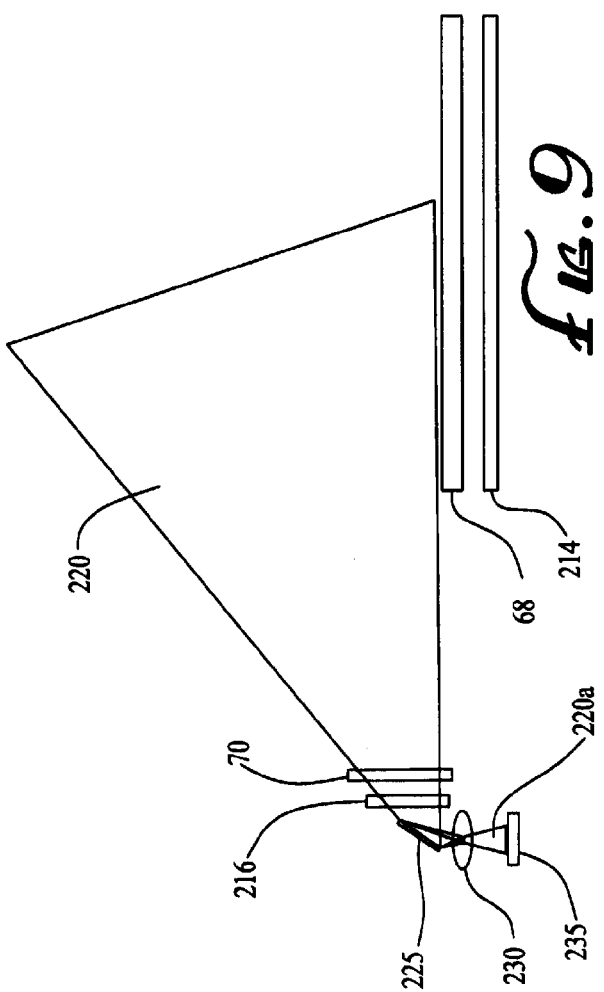
Fig. 12
Fig. 9

BEZEL WITH NON-METALLIC MATERIALS FOR COVER OR PLATTER FOR A DATA READER IN A CHECKOUT STATION

RELATED APPLICATIONS

This application claims priority from U.S. Provisional Patent Application No. 61/657,732, filed Jun. 8, 2012, which is herein incorporated by reference.

BACKGROUND

The field of the present disclosure relates generally to checkout stations for data capture and, more particularly but not exclusively, to such checkout stations that may employ a weigh scale adapted for use with electronic article surveillance (EAS) systems. In both retail checkout and inventory control environments, items are typically provided with readable optical codes such as ID barcode labels (e.g., UPC labels), or stacked and 2D code labels (e.g., PDF 417 or Data matrix). Although there are different types of these optical labels, for the purpose of this description, the terms barcodes and optical codes may be used interchangeably.

Data reading devices such as barcode scanners and RFID readers are provided at the checkout station to read the optical codes and obtain the data contained therein. These data readers automate the information retrieval to facilitate and speed the checkout or inventory process. Thus data readers such as optical code scanners are pervasive at retail checkout.

Scanners generally come in three types: handheld, such as the PowerScan™ PM8500 scanner, fixed and installed in the countertop such as the Magellan® 8500-Xt bioptic scanner, or a hybrid scanner such as the Magellan® 1400i scanner usable in either a handheld or fixed mode. Each of these scanners is manufactured by Datalogic ADC, Inc. of Eugene, Oreg. In a typical retail checkout operation, a checkout clerk uses either a handheld scanner to read the barcode symbols on the articles one at a time or passes the articles through, or presents the articles in, the scan field of the fixed scanner one at a time. The clerk then places the articles into a shopping bag or other suitable container. In a self-checkout operation, a customer may perform these tasks.

Though barcodes provide for rapid and accurate item identification at checkout, the barcodes do not provide for item security against theft. Electronic article surveillance (EAS) systems have employed either reusable EAS tags or disposable EAS tags to monitor articles to prevent shoplifting and unauthorized removal of articles from a store. Reusable EAS tags are normally removed from the articles before the customer exits the store. Disposable EAS tags are generally attached to the packaging (e.g. by adhesive) or are disposed inside item packaging. These tags remain with the articles and must be deactivated (by the checkout station or clerk) before the articles are removed from the store by the customer.

EAS tags are generally classified into two categories: so-called "hard" tags that can be sensed but not deactivated and so-called "soft" tags that can be sensed and deactivated. Hard tags are devices, typically containing electronic circuits or metal magnetic components enclosed in a plastic housing, that are attached to merchandise or packaging and that must be removed by the store clerk using a special tool at the store checkout. Soft tags since they can be deactivated need not be removed. Certain types of soft EAS tags are re-activatable which is useful in applications such as those involving library books and video rentals.

One type of EAS tag comprises a length of amorphous magnetic material that is positioned substantially parallel to a length of magnetizable material used as a control element. When an active tag, i.e., one having a magnetized control element, is placed in an alternating magnetic field, which defines an interrogation zone, the tag produces a detectable valid tag signal. Such interrogation zones are typically located in front of exit doors, and valid tag signals trigger an alarm. When the tag is deactivated by demagnetizing its control element, the tag no longer produces the detectable tag signal and the tag is no longer responsive to the incident energy of the EAS system so that an alarm is not triggered.

Such deactivation of the tag, can occur, for example, when a checkout operator in a retail establishment passes an EAS tagged article over a deactivation device located at the checkout counter thereby deactivating the tag. Generally, deactivation devices of tags include a coil structure energizable to generate a magnetic field of a magnitude sufficient to render the tag "inactive." In other words, the tag is no longer responsive to incident energy applied thereto to provide an output signal or to transmit an alarm condition to an alarm unit external to the tag.

Examples of deactivation devices include those sold under the trademarks Scan Max® and Power Pad® available from Sensormatic Electronics Corporation of Boca Raton, Fla. The Power Pad® deactivator, which generates a magnetic field when a tag is detected, has a single or planar coil disposed horizontally within a housing. In some systems, deactivation occurs when the tag is detected moving horizontally across an EAS deactivation system in a coplanar disposition and within a four-inch (10.2-cm) proximity of the top surface of the housing located on top of a checkout counter. More generally, deactivation may occur in varying probabilities dependent on distance and orientation relative to the antenna.

EAS deactivation systems have been integrated into the structure of a barcode scanner and particularly into checkout stations that include a weigh scale as well a barcode scanner. In one system, an EAS deactivation coil is disposed around the horizontal scan window of a two-window L-shaped scanner such as the Datalogic Magellan® 8400 scanner. In such a system, barcode scanning and EAS tag deactivation are accomplished generally within the same volume. The deactivation either takes place at the same time as the scanning, or the deactivation may be controlled to activate after a successful barcode read. U.S. Pat. Nos. 7,374,092 and 7,495,564, and 7,619,527 disclose EAS tag deactivation systems integrated into a checkout station.

However, checkout stations typically employ a stainless steel plate (cover or platter) that surrounds a lower scanning window. Stainless steel is employed because it holds up well to the constant sliding of items across it and because it is easy to clean. Moreover, some checkout stations that are constructed to include an integrated weigh scale similarly typically employ a stainless steel cover to surround the lower scanning window because stainless steel is easily cleanable and is resistant to wear from items sliding across it. The terms platter or cover may be used interchangeably.

Unfortunately, the stainless steel platter may reduce the effectiveness of the deactivation system. For example, the stainless steel platter can create a closed loop (around the lower window) that interferes with the magnetic pulse generated by the deactivation system, attenuating the range of the magnetic field so that operation of the deactivation system becomes degraded and/or inconsistent. The failure to deactivate an EAS tag can result in undesirable false alarms from the EAS system.

To eliminate the closed metallic loop, platters have been constructed with a non-metallic portion. The present inventors have recognized the tendency to make these non-metallic portions small because of the preference for stainless steel surfaces where the items are dragged across the platter.

BRIEF DESCRIPTION OF THE DRAWINGS

Understanding that drawings depict only certain exemplary embodiments and are not therefore to be considered limiting in nature, the exemplary embodiments will be described and explained with additional specificity and detail through the use of the accompanying drawings.

FIG. 3 is a plan view of the top of the checkout station of FIG. 1.

FIG. 4 is a plan view of the top of a bezel of the cover shown in the checkout station of FIG. 1.

FIG. 5 is a plan view of the bottom of the bezel of FIG. 4.

FIG. 6 is a side view of the bezel of FIG. 4.

FIG. 7 is a perspective view of the top of the bezel of FIG. 4.

FIG. 8 is a perspective view of the bottom of the bezel of FIG. 4.

FIG. 9 is a schematic of a scan region and imaging components for scanning an item through an upper window of the cover shown in FIGS. 1 and 3.

FIG. 12 is a block diagram of an EAS deactivation system optionally included in an optical code reader and/or checkout station of FIGS. 1-3.

DETAILED DESCRIPTION OF EMBODIMENTS

With reference to the above-listed drawings, this section describes particular embodiments and their detailed construction and operation. The embodiments described herein are set forth by way of illustration only and not limitation. It should be recognized in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
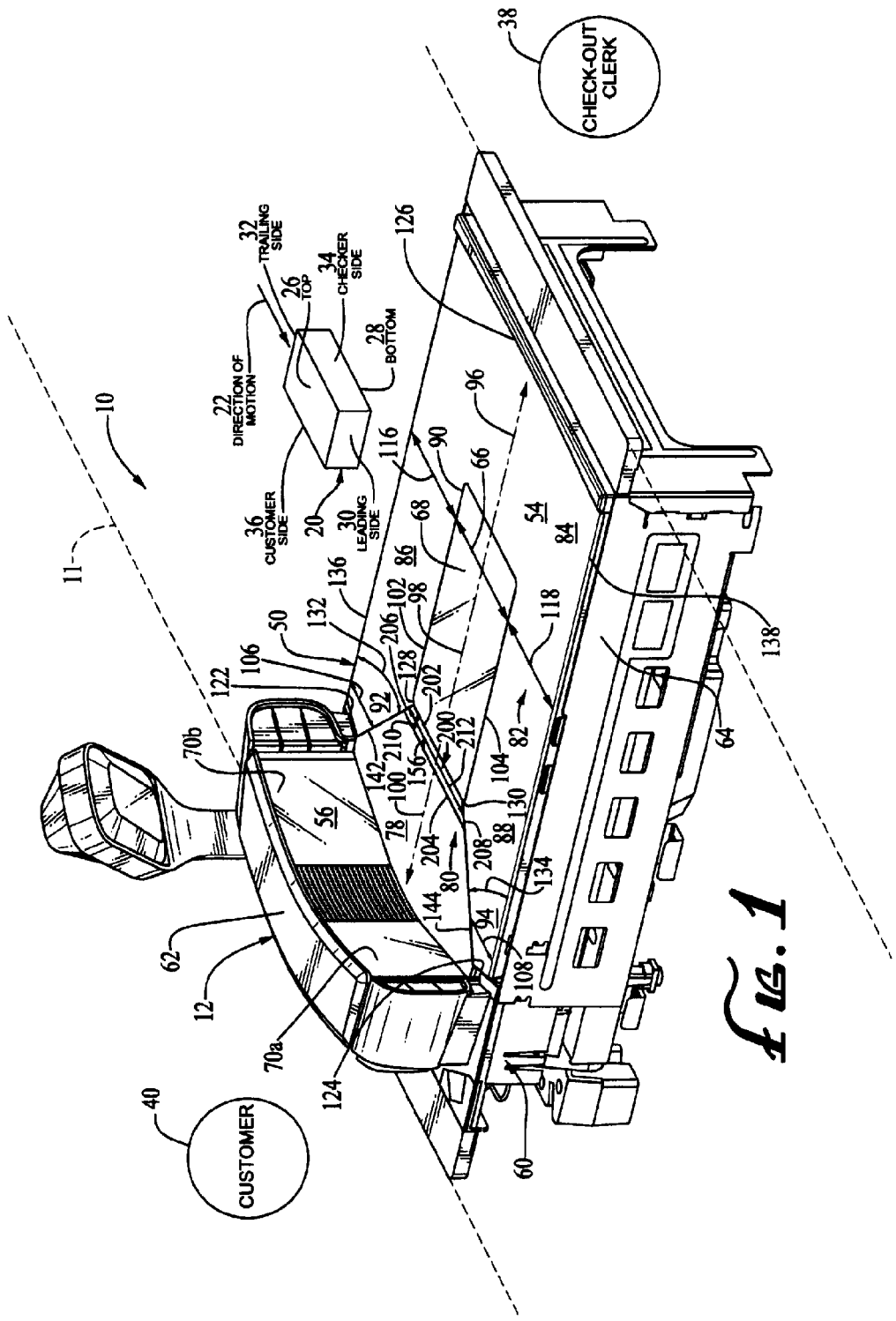
FIG. 1 is an isometric view of a checkout station including an optical code reader having a cover or a platter.

FIG. 1 illustrates a checkout station 10 having a counter 11 and an optical code reader 12 with a read region or view volume through which items 20 may be passed to obtain information, such as product codes (that might indicate cost information), about the items 20. In one embodiment, the optical code reader 12 is a high-throughput barcode reader having a laser-based scanner with a multiple window or bioptic configuration such as the Magellan® 8500Xt bioptic scanner available from Datalogic ADC, Inc. of Eugene, Oreg. In another embodiment, an imager-based scanner with a bioptic configuration may be employed. However, scanners with a single plane, tunnel, or other configuration could alternatively be employed. Retail establishments such as grocery stores require such high-throughput and fast scanners. Thus checkout lanes, both checker-assisted and self-checkout, are commonly configured to accommodate such a bioptic scanner, but other types of data readers may be employed. As to the description of the following embodiments, it should be understood that certain capabilities of the optical code reader 12 will be described with respect to reading sides of an item 20 and that a checkout station 10 is an exemplary use for the optical code readers 12 discussed herein and should not be considered as limiting.

In general, the view volume of the optical code reader 12 may be a function of the enclosure, such as a housing 60, the style of the optical code reader 12, and the perspectives of the views in which images of the items 20 are captured. A perspective may encompass a location, direction, angle, or any combination of the foregoing, or the like, that characterize a vantage or point of view for seeing, imaging, visualizing via machine vision, or illuminating the item 20 or a part of the item 20.

For general purposes of discussion, the item 20 is represented by a rectangular shaped six-sided polyhedron, such as a cereal box (hereinafter referred to as a box-shaped item) that may be passed through the view volume of the optical reader 12 as installed in the checkout station 10 at a retail store (e.g., a supermarket). The box-shaped item 20 may be described with respect to its direction of motion 22 across a cover or platter 50 that covers a portion of the housing 60 of the optical code reader 12. For the purposes of description relative to the ability of the optical code reader 12 to read certain of the sides of the box-shaped item 20 being passed through the view volume, the box-shaped item 20 may be described in the orientation as illustrated as having a top side 26, a bottom side 28, and four lateral sides 30, 32, 34, and 36. The lateral sides may be referred to as the leading (or left lateral) side 30 (the side leading the item 20 as it is passed through the view volume), the trailing (or right lateral) side 32 (the trailing side of the item as it is passed through the view volume), the checker (or front lateral) side 34 (due to its proximity to a checkout clerk 38), and the customer (or rear lateral) side 36 (due to its proximity to a customer 40). It will be appreciated that a customer 40 may be in the checkout clerk position at a self-checkout station; however, for convenience and clarity, the customer-side relationship to the orientation of item 20 and other features of the checkout station 10 will be presented as such relationships appear in the figures.

An upper or vertical housing section 62 of the optical code reader 12 may separate the customer 40 from the item 20 if the optical code reader 12 is a vertical optical code reader, a bioptic optical code reader, or a tunnel optical code reader. The bottom side 28 may alternatively be described as the side facing a lower surface 54 of the cover/platter 50 that covers a portion of a lower or horizontal housing section 64 of the housing 60. The customer side 36 or rear lateral side may alternatively be described as a wall side 36 or a side oriented generally vertically and facing an upper surface 56 of the cover/platter 50. The checker side 34 or front lateral side may alternatively be described as the side facing opposite the customer side 36.

Figure 2:
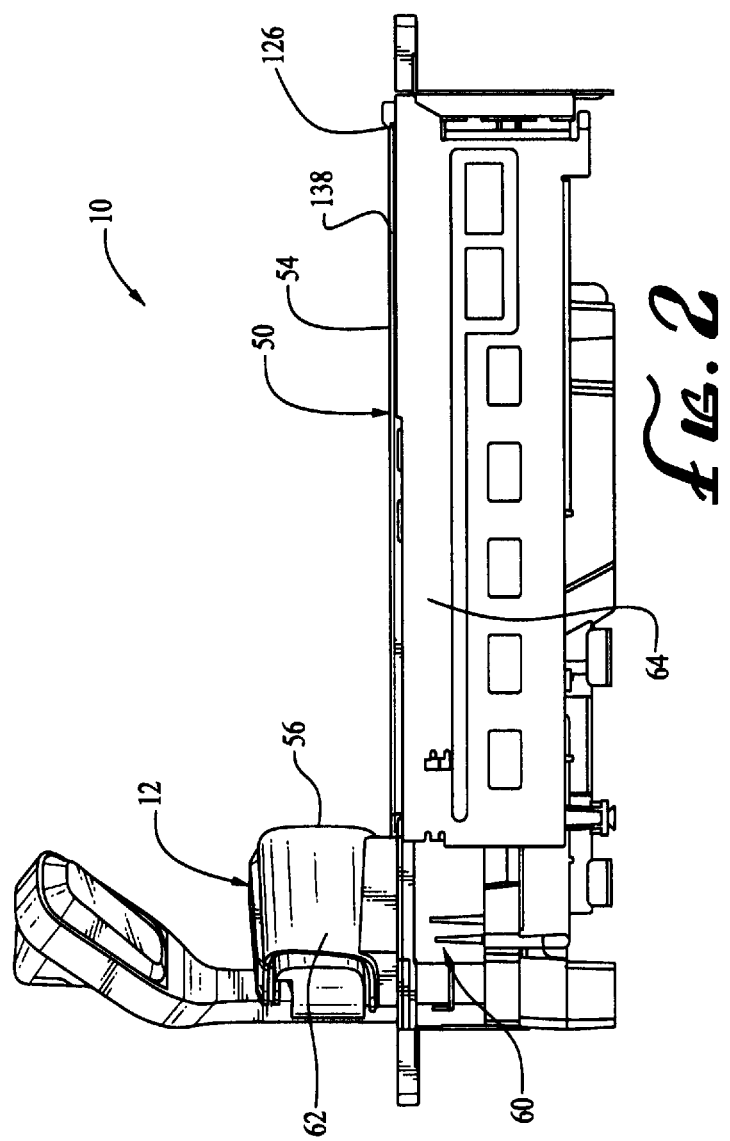
FIG. 2 is a side view of the checkout station of FIG. 1.

FIGS. 2 and 3 show alternative views of the optical code reader 12 of the checkout station 10. With reference to FIGS. 1-3, optical code readers 12 such as barcode scanners often include a scale apparatus for measuring weights of produce and other items sold by weight. The scale apparatus typically has one or more load cells and the cover/platter 50 may comprise a weigh platter that rests on the load cell(s). The cover/platter 50 is typically flush mounted with the top surface of the checkout counter 11 of the checkout station 10. The upper surface 56 of the cover/platter 50 is transverse to, and preferably attached to or supported by, the lower surface 54. In some embodiments, the lower surface 54 is flat and horizontal and the upper surface 56 is flat and vertical such that they are perpendicular; however, either surface may be sloped or curved. In some embodiments, the upper surface 56 has a concave curvature or V-shape such that the upper surface 56 curves away or angles away from the lower surface 54. In some embodiments, the lower surface 54 has a depression and/or a channel toward the checker side of the lower surface 54.

The lower surface 54 includes one or more (typically one) lower windows 68, and the upper surface 56 includes one or more upper windows 70 (such as split windows 70a and 70b in FIG. 1). The view volume of the optical code reader 12 is bounded by the lower surface 54 and the upper surface 56 of the cover/platter 50 (as well as determined by the lower and upper windows 68 and 70 and the imagers). The upper window 70 may be curved, if the upper surface 56 is curved, and may nest into flanges (not shown) such that the surface of the upper window 70 is recessed or flush with respect to the rest of the upper surface 56. Furthermore, when the upper window 70 is recessed within the curvature of the upper housing section 62, the upper window 70 may employ less expensive transparent material than the more expensive scratch-resistant glass or sapphire coating preferred for the lower window 68.

FIGS. 4-8 illustrate different views of an exemplary bezel 80 that provides part of the lower surface 54. With reference to FIGS. 1-8, in some embodiments, the lower surface 54 employs: a metallic or conductive plate 82; a glass, plastic, or other transparent material for the lower window 68; and a nonmetallic or nonconductive material for the bezel 80. The metallic plate 82, the lower window 68, and the bezel 80 may form an integrated piece. Alternatively, one or more of the metallic plate 82, the lower window 68, and the bezel 80 may be separately connected. The lower window 68 may nest within a subsurface flange (not shown) of the metallic plate 82 such that the surface of the lower window 68 is flush with the metallic plate 82. In some embodiments that include an upper surface 56, the bezel 80 may be positioned between the lower window 68 and the upper surface 56.

The metallic plate 82, the lower window 68, and the bezel 80 may have respective central axes 96, 98, and 100 that may be coplanar and/or collinear; and the metallic plate 82, the lower window 68, and the bezel 80 may be symmetric on opposite sides of the central axes 96, 98, and 100. However, the metallic plate 82, the lower window 68, and the bezel 80 may be asymmetric, or their central axes 96, 98, and 100 may not be collinear.

The metallic plate 82 is preferably made of stainless steel; however, the metallic plate 82 can be made from any material that holds up well to the constant sliding of items 20 across it and that is easy to clean. The bezel 80 is made of a nonmetallic or nonconductive material. The material of bezel 80 is also preferably resistant to wear from sliding of items 20 across it and is easy to clean. In preferred embodiments, the bezel 80 may be made from a urethane thermoplastic elastomer, such as Texin® 260, which has a Taber wear rating (per ASTM D3489) of 50 mg loss using a H-18 wheel, 1000 gram loading at 1000 cycles. Other suitable nonmetallic materials may be used, such as thermoplastic elastomers having a wear of less than or equal to 50 mg loss at the equivalent standard. Furthermore, alternative wear resistant nonmetallic materials may include acetal, nylon, and other elastomers in the 50-90 Shore D range.

In some embodiments, optical code reader 12 uses ambient light of the checkout environment to create images of the items 20. In many embodiments of optical code reader 12, illumination sources such as light emitting diodes (LEDs) or other suitable light sources are used to illuminate the items 20 that are being scanned. Light from these illuminators can be unintentionally directed or reflected into the eyes of the customer 40 or checkout clerk 38. To limit such undesirable reflections, in preferred embodiments, the bezel 80 is composed of a material that is, or has an upper surface 78 that is, relatively dark, non-transparent, or manufactured to reduce specular reflections from its surface (or be relatively non-reflective) for some or all of the wavelengths of light directed at the items 20 as they are passed across the view volume. In some embodiments, the bezel 80 has a reflectivity of less than 25% and preferably less than 15% to light in the visible spectrum at room temperature. In some embodiments, the bezel 80 has a reflectivity of less than 10% and preferably less than 5% to light in the visible spectrum at room temperature. The bezel 80 based on its material, surface characteristics, size, and shape may reflect less than 15% of the light supplied by the illumination system of the checkout station 10. In some embodiments, the bezel 80 may reflect less than 5% of the light supplied by the illumination system of the checkout station 10. In general, the bezel 80 provides lower reflectance (or has a lower reflectivity) than that provided by the metallic plate 82. For example, in comparison with a stainless steel surface, the nonmetallic bezel 80 may reflect about one-eighth (12.5%) or less of light (in the visible spectrum) reflected by a stainless steel surface per equivalent area. This reduced reflection is a function of the material properties and surface finish. A matte surface will scatter light and therefore directly reflect less light than a polished surface. The non-reflective or light scattering properties of the bezel surface 78 help reduce the amount of light directed or reflected toward at least one of the customer 40 and the checkout clerk 38.

In some embodiments, the bezel 80 has a bezel surface area that is greater than 16% of the total area of the lower surface 54. In some embodiments, the bezel 80 has a bezel surface area that is greater than 18% of the total area of the lower surface 54. In some embodiments, the bezel 80 has a bezel surface area that is greater than 20% of the total area of the lower surface 54. In some embodiments, the bezel 80 has a bezel surface area that is greater than 25% of the total area of the lower surface 54. In some embodiments, the bezel surface area is greater than or equal to 60% of the area of the portion of the lower surface between the lower window 68 and the upper surface 56. In some embodiments, the bezel surface area is greater than or equal to 65% of the area of the portion of the lower surface between the lower window 68 and the upper surface 56. In some embodiments, the bezel surface area is greater than or equal to 68% of the area of the portion of the lower surface between the lower window 68 and the upper surface 56. In some embodiments, the bezel surface area is greater than or equal to 70% of the area of the portion of the lower surface between the lower window 68 and the upper surface 56.

Alternatively or additionally, in some embodiments, the bezel 80 has a surface area that is greater than or equal to 50% of the size of the surface area of the lower window(s) 68. In some embodiments, the bezel 80 has a surface area that is greater than or equal to 75% of the size of the surface area of the lower window(s) 68. In some embodiments, the bezel 80 has a surface area that is greater than or equal to 90% of the size of the surface area of the lower window(s) 68. In some embodiments, the bezel 80 has a surface area that is greater than or equal to the size of the surface area of the lower window(s) 68.

Alternatively or additionally, in some embodiments, the bezel 80 has a surface area that is greater than 5,000 mm². In some embodiments, the bezel 80 has a surface area that is greater than 7,500 mm². In some embodiments, the bezel 80 has a surface area that is greater than 8,000 mm². In some embodiments, the bezel 80 has a surface area that is greater than 10,000 mm². In some embodiments, the bezel 80 has a surface area that is greater than 12,000 mm². In some embodiments, the bezel 80 has a surface area that is greater than 14,000 mm².

In general, as the bezel surface area is increased, the amount of light reflected toward at least one of the customer 40 or the checkout clerk 38 is reduced relative to the amount of light reflected from the replaced surface area of the metallic plate 82. Also in general, as the bezel surface area is increased, the material cost of the lower surface 54 (and the cover/platter 50) is decreased relative to the cost of the replaced surface area of the metallic plate 82.

In addition, as the bezel surface area is increased, the performance of the EAS deactivation system may be enhanced. In particular, increased bezel surface area enhances the strength of the magnetic field used to deactivate the security or surveillance tags because the reduced amount of metallic surface area interferes less with the magnetic field employed in the EAS deactivation system. As a result, less powerful EAS deactivation system components can be employed thereby reducing manufacturing costs. Also, less power can be used to generate the magnetic field employed in the EAS deactivation system, so the operating costs of the optical code reader 12 can be reduced. Similarly, the bezel 80 may also enhance the effectiveness of an RF-type EAS deactivation system. Moreover, the increased bezel surface area provides a larger gap (or length 172) between proximal end sections 92 and 94 of the metallic plate 82. The larger gap reduces the chance of large electrically conductive items 20 bridging the gap between the proximal end sections 92 and 94 and closing the loop of the metallic plate 82. A bridged gap can potentially cause the electrically conductive items 20 to cause a spark that may be disconcerting to the checkout clerk 38 or the customer 40.

In some embodiments, the metallic plate 82 has a distal end section 84 (checker end section) and two side sections (leading and trailing side sections) 86 and 88. The side sections 86 and 88 are typically longer than the distal end section 84, and they include the separate respective proximal end sections 92 and 94, such that they partly surround a horizontal perimeter 90 of the lower window 68. The proximal end sections 92 and 94 preferably extend beyond the lengths of leading and trailing sides 102 and 104 of the lower window 68; however, the proximal end sections 92 and 94 need not extend beyond the leading and trailing sides 102 and 104. The proximal end sections 92 and 94 may extend to and support the upper surface 56. However, the proximal end sections 92 and 94 may be constructed with shapes or dimensions that avoid contact with the upper surface 56.

The proximal end sections 92 and 94 may have respective widths 106 and 108 that are the same lengths as the widths 116 and 118 of the respective sides 86 and 88. Widths 106 and 108 may be the same or different, and widths 116 and 118 may be the same or different. The proximal end sections 92 and 94 may taper so that they have narrower widths 106 and 108 as they extend toward the upper surface 56. In one configuration, the proximal end sections 92 and 94 begin to taper from the customer side corners 128 and 130 of the lower window 68. In some embodiments, the proximal end sections 92 and 94 have respective taper angles 132 and 134 of greater than or equal to 30 degrees between the respective leading and trailing sides 136 and 138 of the metallic plate 82 and the respective leading and trailing sides 142 and 144 of the bezel 80. In some embodiments, the proximal end sections 92 and 94 have respective taper angles 132 and 134 of greater than or equal to 45 degrees. The taper may be linear (as in the illustrated examples) or non-linear such as curved, stepped, or otherwise segmented. However, the proximal end sections 92 and 94 need not taper completely to points. The proximal end sections 92 and 94 preferably have respective proximal ends 122 and 124 that are parallel with a distal end 126 of the distal end section 84. Furthermore, the proximal ends 122 and 124 need not be straight and can be curved.

With particular reference to FIGS. 3 and 4, the bezel leading and trailing sides 142 and 144 may be straight or curved and may be the same or different. They are, however, preferably symmetrical. The bezel leading and trailing sides 142 and 144 may contain only single segments or may contain multiple segments. These segments may be linear or curved, and the bezel leading and trailing sides 142 and 144 need not have the same number of segments. In some embodiments, the bezel leading and trailing sides 142 and 144 have respective flare angles 146 and 148 with respect to central axis 100 that can vary in the range from zero to 90 degrees. In some embodiments, the flare angles 146 and 148 are each greater than or equal to 20 degrees or greater than or equal to 30 degrees. In some preferred embodiments, the flare angles 146 and 148 are each greater than or equal to 45 degrees. However, in some embodiments, flare angles 146 and 148 may be less than 20 degrees.

In addition to the respective bezel leading and trailing sides 142 and 144, the bezel 80 has a bezel checker side 156 (also referred to as the bezel lower window side or the bezel distal side) and a bezel customer side 158 (also referred to as the bezel upper window side or the bezel proximal side). In some embodiments, the bezel checker side 156 is contoured to match a customer side of the lower window 68. The bezel checker side 156 may be generally straight. However, the bezel checker side 156 may be curved or include transverse segments depending on where the bezel leading and trailing sides 142 and 144 originate with respect to the respective leading and trailing sides 102 and 104 of the lower window 68. However, the bezel leading and trailing sides 142 and 144 may originate at or in proximity to, or be aligned with the respective corners 128 and 130 of the lower window 68.

The bezel leading and trailing sides 142 and 144 may form respective bezel checker side angles 152 and 154 with respect to the bezel checker side 156 (in which case the bezel leading and trailing sides 142 and 144 may be spaced apart from the respective corners 128 and 130 of the lower window 68, and the bezel leading and trailing sides 142 and 144 may or may not be angularly aligned to intersect the respective corners 128 and 130). The bezel checker side angles 152 and 154 are preferably obtuse. In some embodiments, the bezel checker side angles 152 and 154 are greater than 120 degrees. In some preferred embodiments, the bezel checker side angles 152 and 154 are greater than 135 degrees.

The bezel customer side 158 preferably conforms to the shape of the upper surface 56 and may support it. In particular, the bezel customer side 158 may be straight, but is preferably curved. In some embodiments, the curvature is simple, but it may be complex with straight and/or curved sections. In some embodiments, the curvature may be convex. In some examples, the bezel customer side 158 may have an arc angle θ greater than 40, 60, or 90 degrees. In some preferred embodiments, the curvature has a radius of curvature greater than 5 inches (12.7 cm), 10 inches (25.4 cm), 11.8 inches (30 cm), or 20 inches (50.8 cm). in some embodiments, the bezel customer side has a maximum radius of curvature of 100 inches (254 cm).

The bezel customer side 158 may include only a single straight or curved shape or it may include multiple straight and/or curved segments. In some embodiments, the bezel customer side 158 has a central curved or straight segment or portion 160 and two side segments or portions 162 and 164.

The bezel customer side segments 162 and 164 may connect directly with the respective bezel leading and trailing sides 142 and 144. Alternatively, the bezel customer side segments 162 and 164 may be spaced apart from major portions of the respective bezel leading and trailing sides 142 and 144 by respective bezel leading and trailing side tips 166 and 168. For convenience, the bezel leading and trailing side tips 166 and 168 may be considered to form part of the respective bezel leading and trailing sides 142 and 144. Regardless of spacing, intersection, or curvature, the bezel customer side segments 162 and 164 may present general respective bezel customer angles 174 and 176 with respect to the respective bezel leading and trailing sides 142 and 144. The bezel customer angles 174 and 176 are greater than 30 degrees and preferably greater than 40 degrees. In some embodiments, the bezel customer angles 174 and 176 are greater than the taper angles 132 and 134.

In some embodiments, the bezel customer side 158 has a length 170 that is greater than a length 172 of the bezel checker side 156. In some embodiments, the length 170 is shorter than twice the length 172. In some embodiments, the length 170 is greater than 30% longer than the length 172. Similarly, in some embodiments, the length 170 of the bezel customer side is greater than the length 66 of the lower window 68. In some embodiments, the length 170 of the bezel customer side is greater than 25% longer than the length 66 of the lower window 68. In some embodiments, the length 170 of the bezel customer side is greater than 50% longer than the length 66 of the lower window 68. In some embodiments, the length 170 of the bezel customer side is greater than 75% longer than the length 66 of the lower window 68. In some embodiments, the length 170 of the bezel customer side is greater than 100% longer than the length 66 of the lower window 68. Alternatively, the length 172 of the bezel checker side 156 may be longer than or equal to the length 170 of the bezel customer side 158.

The bezel 80 has a width 180 between the bezel checker side 156 and the bezel customer side 158 along the central axis 100. The width 180 is preferably shorter than the length 172; however, in some embodiments, the width 180 may be greater than the length 172. In some embodiments, the width 180 is greater than or equal to one inch (2.5 cm) such that the bezel checker side 156 is at least one inch (2.5 cm) or greater distance from the upper surface 56 along the central axis 100. In some embodiments, the width 180 is greater than or equal to 1.5 inches (3.8 cm) such that the bezel checker side 156 is at least 1.5 inches (3.8 cm) or greater distance from the upper surface 56 along the central axis 100. In some embodiments, the width 180 is greater than or equal to 1.8 inches (4.5 cm) such that the bezel checker side 156 is at least 1.8 inches (4.5 cm) or greater distance from the upper surface 56 along the central axis 100. In some embodiments, the width 180 is greater than or equal to two inches (5.1 cm) such that the bezel checker side 156 is at least two inches (5.1 cm) or greater distance from the upper surface 56 along the central axis 100. In some embodiments, the width 180 is greater than or equal to two and one half inches (6.4 cm) such that the bezel checker side 156 is at least two and one half inches (6.4 cm) or greater distance from the upper surface 56 along the central axis 100.

In some preferred embodiments, the width 180 is greater than or equal to three inches (7.6 cm) such that the bezel checker side 156 is at least three inches (7.6 cm) or greater distance from the upper surface 56 along the central axis 100.

The width 180 and surface area of the bezel 80 provide visual cues to the checkout clerk 38 to pass the item 20 at a minimum preferable distance from the upper windows 70a and 70b. In addition to reducing wear against the material of the upper windows 70a and 70b from sliding items 20, a certain/given distance from the upper windows 70a and 70b provides a larger cross-section of area of the view volume for an item 20 to pass through. In particular, the upward, downward, and side-to-side perspectives encompass more area as they spread out from the upper windows 70a and 70b, permitting scans of items 20 (with optical codes) that are higher than the height of the upper windows 70a and 70b. Thus, in some embodiments, the width 180 may be selected based on the minimum preferable distance that takes into account the cross-sectional area of the view volume at different distances from the upper windows 70a and 70b with consideration of the optical focal distances from the imagers of the optical code reader 12. For example, the width 180 may be selected to provide a view volume with a minimum height of 8 inches (20.3 cm) above the cover/platter 50 in the plane of the bezel checker side 156. In some alternative configurations, the width 180 may be selected to provide a view volume with a minimum height of 10 inches (25.4 cm) or 12 inches (30.5 cm) above the cover/platter 50 in the plane of the bezel checker side 156. Alternatively, the width 180 may be selected to provide the checkout clerk 38 with a visual guide for a preferred minimum distance optimized based on the optics associated with the imagers.

The bezel 80 may be part of a substructure of the weigh cover 50 and made so that its surface is flush with the surface of the metallic plate 82, or the bezel 80 can be primarily a surface structure that attaches to the substructure. For example, with reference to FIGS. 5-8, the bezel 80 may be provided with one or more tabs 184 and slots (or holes of other desirable shape(s)) 186 to facilitate attachment to the metallic plate 82, the upper surface 56, or a lower window frame. Alternatively, tabs 184 may be used to support the lower window 68 directly. The bezel 80 may also include supports 188 on its underside 190. In some embodiments, the bezel 80 snaps into the cover/platter substructure. The cover/platter substructure may be a stiff plastic support piece that rests on the scale arms. The cover/platter substructure houses the window, and the stainless steel bezel is taped onto it or otherwise secured to it using an appropriate attachment method. In some embodiments, the upper platter section is insert injection molded onto this part.

With reference again to FIGS. 1 and 3, in some embodiments, the cover/platter 50 has an optional spacer strip 200 between the lower window 68 and the bezel 80. The spacer strip 200 has checker and customer sides 202 and 204 and leading and trailing sides 206 and 208. The spacer strip 200 also has a spacer width 210 along the central axis 98 or 100 between the spacer checker and customer sides 202 and 204 that is shorter than the width 180 of the bezel 80, and the spacer strip 200 has a spacer length 212 between the spacer leading and trailing sides 206 and 208 that is longer than a length 66 of the lower window 68. The spacer strip 200 may have angles between the spacer leading and trailing sides 206 and 208 and the spacer checker side 202 that are the same as, or different from, the respective bezel checker side angles 152 and 154. The spacer strip 200 has a surface area that is smaller than the surface area of bezel 80.

The spacer strip 200 is made from a nonmetallic (or nonconductive) material that may be the same as, or different from, the material of the bezel 80. The spacer strip 200 may reduce reflectivity and/or enhance the performance of the EAS deactivation system in a manner similar to the reflectivity reductions and EAS enhancements provided by the bezel 80. The spacer strip 200 may provide a location for a brand or store label or an embedded brand or store name. Furthermore, the spacer strip 200 provides a buffer area between the bezel 80 and the lower window 68 such that items 20 will be less likely to slide across and cause wear to the bezel 80. Because the bezel 80 has more surface area and is a more expensive part, one advantage for using the spacer strip 200 is that it would be cheaper to replace if it were to become abraded by dragging the items 20 across it.

FIG. 9 illustrates an example embodiment for imaging system components of the optical code reader 12 of FIG. 1 that may be operative for reading optical codes on the customer side 36 of the item 20 (facing away from the checkout clerk 38). With reference to FIGS. 1, 3, and 9, the cover/platter 50 and most of the enclosure components have been removed to reveal the interior optical arrangement. For reference, the lower window 68 of the cover/platter 50 from FIGS. 1 and 3 is included in FIG. 9, with a lower internal window 214, not shown in FIGS. 1 and 3, disposed below the lower window 68. An exemplary alternative embodiment for imaging system components of the optical code reader 12 is described in U.S. Prov. Pat. Appl. No. 61/657,660, which is herein incorporated by reference.

Typically, where the optical code reader 12 includes a scale (and thus the optical code reader 12 is a scanner-scale), the cover/platter 50 typically comprises a weigh platter supported on one or more load cells in accordance with a suitable construction. The lower internal window 214 serves to seal off the internal components within the lower housing section 64. The lower internal window 214 may also permit the cover/platter 50 to be removable without exposing certain internal components.

The customer side 36 of the item 20 with codes facing away from the checkout clerk 38 is primarily viewed by a folded imaging system comprising one or more imagers or sensor arrays 235, lens system 230, (primary) fold mirror 225, and windows 70a and 70b. The field of view of the camera (image sensor 235 and lens system 230) in the plane of the FIG. 9 is represented by the regions 220 and 220a. Region or view segment 220a is the field of view of the camera formed by the image sensor 235 and the lens system 230 prior to reflection from the fold mirror 225. The region or view segment 220 is the camera field of view after being redirected or folded by the primary fold mirror 225 and constitutes the view volume portion captured by the image sensor 235. This imaging system's components may, but need not, protrude above the top surface of the lower window 68 because they are distant from the checkout clerk 38 and should not interfere with typical body motions of the checkout clerk 38.

The embodiments of the optical code reader 12 shown in and described with respect to FIGS. 1-11 are, only by way of example, configured with a low-profile upper housing section 62. Other configurations, including configurations with higher profiles, for these upper housing sections 62 may be employed such as those upper housing section configurations disclosed in U.S. Pat. No. 8,261,990 and U.S. patent application Ser. No. 12/646,829, which are herein incorporated by reference.

The cover/platter 50 may be a weigh platter configured in a dual plane configuration as shown or such as in the All-Weighs® platter available from Datalogic ADC, Inc. of Eugene, Oreg. or as described in U.S. Pat. No. RE 40,071, which is herein incorporated by reference. In particular exemplary embodiments, the upper window(s) 70 may be supported on a dual-plane weigh platter 50 with the internal upper window 216, the fold mirror 225, and the remaining optics being supported off-platter within the upper housing section 62 or the lower housing section 64. Alternatively, a portion of the upper housing section 62, as well as the upper window(s) 70, and the fold mirror 225 may be all supported on-platter, and the remaining optics may be supported off-platter within the upper housing section 62 and/or the lower housing section 64. The term on-platter refers to any element being supported on or with the weigh platter 50 and thus being part of the load being weighed. The term off-platter refers to elements not supported on or with the weigh platter 50 and thus are not part of the load.

Figure 10:
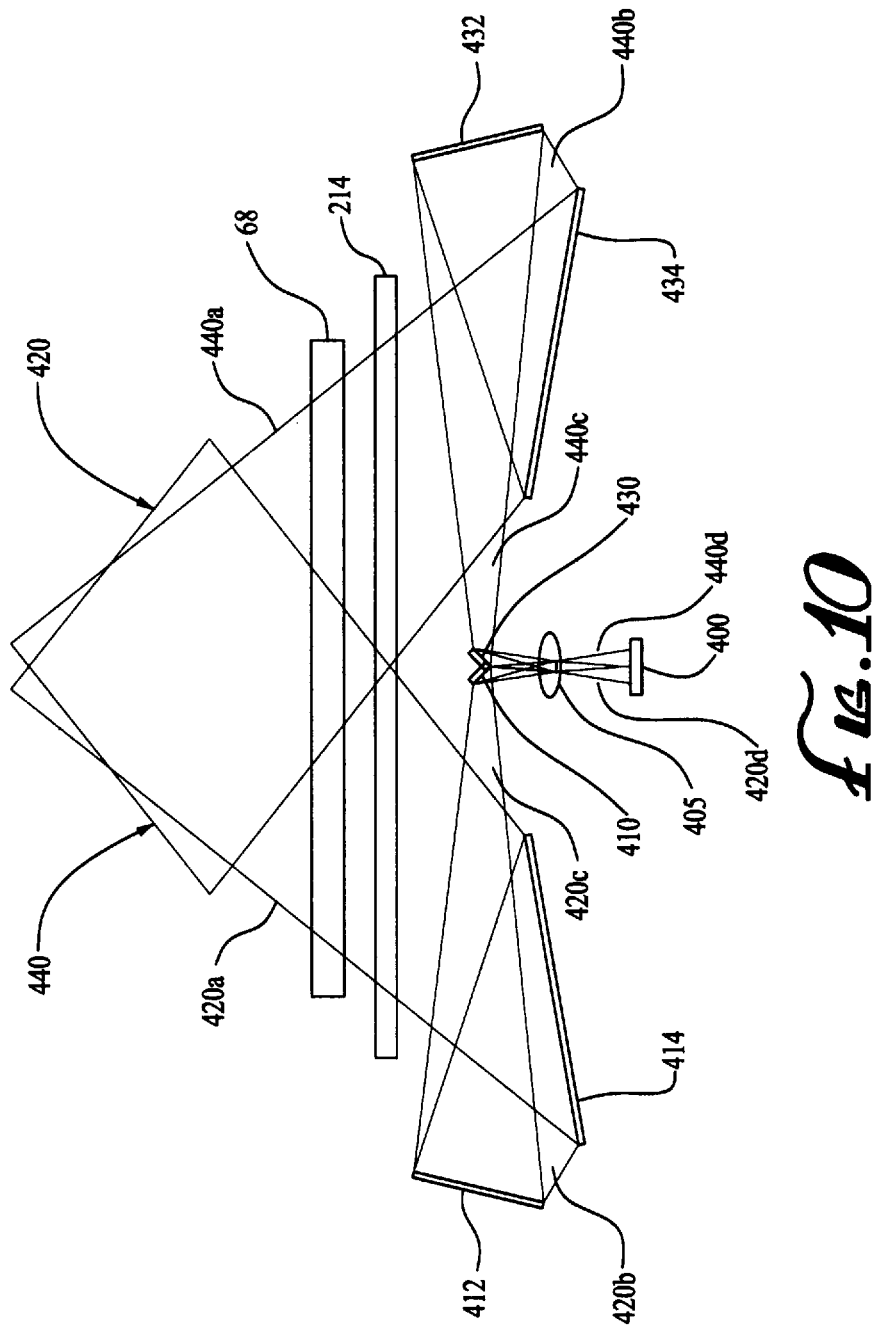
FIG. 10 is a schematic of scan regions and imaging components for scanning an item through a lower window of the cover shown in FIGS. 1 and 3.

FIG. 10 schematically illustrates details of an exemplary imaging camera system suitable for use in the optical code reader 12 of FIGS. 1-3, the system operative to view out through the windows 60 and 214 the optical codes that are facing either in the direction of travel 22 (leading side 30), or away from the direction of travel 22 (trailing side 32). For this functionality, a single imager or sensor array 400 can be used whose field-of-view is split into two parts represented by view regions 420 and 440, which together constitute the view volume portion captured by the imager 400. This imaging camera system comprises the imager or sensor array 400, a lens system 405, tertiary field-splitting mirrors 410 and 430, a first set of a primary fold mirror 414 and a secondary fold mirror 412, and a second set of a primary fold mirror 434 and a secondary fold mirror 432.

The field of view 420 provides a view of the bottom side 28 and the leading side 30 of the item 20 as it is passed through the view volume. The field of view 420 has a first view segment 420a passing through the windows 214 and 68 and then is redirected upwardly by the primary fold mirror 414, whereby a second view segment 420b passes to and is redirected sidewardly by the secondary mirror 412, whereby a third view segment 420c passes to and is redirected downwardly by the tertiary fold mirror 410, whereby a fourth view segment 420d is focused by the lens system 405 onto the imager 400. In similar fashion the field of view 440 provides a view of the bottom side 28 and the trailing side 32 of the item 20. The field of view 440 has a first view segment 440a passing through the windows 214, 68 and then is redirected upwardly by the primary fold mirror 434, whereby a second view segment 440b passes to and is redirected sidewardly by the secondary fold mirror 432, whereby a third view segment 440c passes to and is redirected downwardly by the tertiary fold mirror 430, whereby a fourth view segment 440d is focused by the lens system 405 onto the imager 400. The imager 400 may comprise two separate imagers (mounted, for example, on a common printed circuit board), one for each field of view 420 and 440, or the imager 400 may comprise a single component wherein each field of view is focused on a separate part of the imager area. One such suitable imager is the model EV76C560 1.3 MP CMOS image sensor available from e2V of Essex, England and Saint-Egrève, France. Further embodiments and details for such lateral scan views may be found in U.S. Pat. No. 8,261,990 and U.S. patent application Ser. No. 12/646,829, which are herein incorporated by reference. It is noted that the figures only show portions of the view volumes and are not intended to represent either the near field or far field extent of the view volumes.

In some embodiments, the lower windows 68 and 214 and the upper windows 70 and 216 may be transparent plates that may be respectively separated or adjoining. In other configurations, some or all of the windows 68, 70, 214, and 216 may be divided into multiple windows. In alternative embodiments, the cover/platter 50 or the housing sections 62 and 64 include additional windows along with suitable fold mirrors and cameras (focusing lenses and image sensors) for providing additional scan views.

Figure 11:
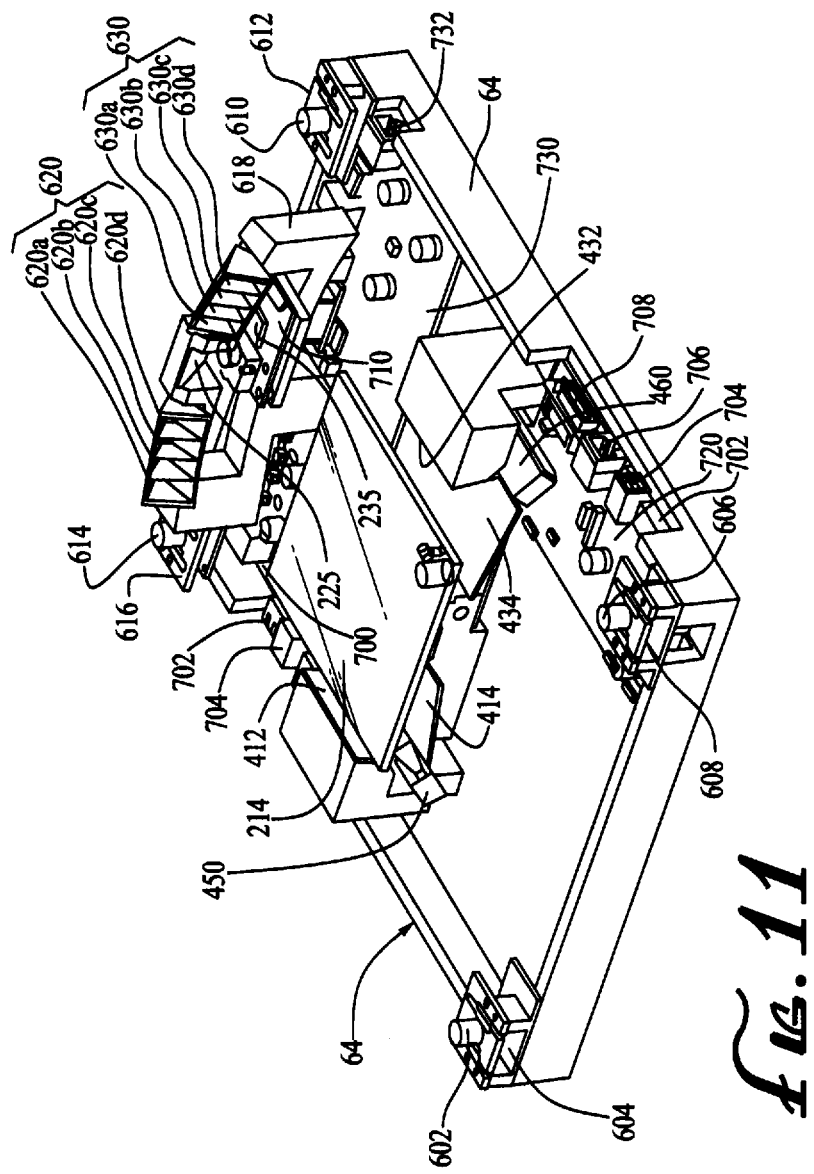
FIG. 11 is an isometric view of internal components of the optical code reader covered by the cover shown in FIGS. 1 and 3.

FIG. 11 illustrates some of the internal components of the optical code reader 12. It is noted that the internal optics are the same as shown in the schematics of FIGS. 9 and 10 and thus like element numerals will be employed. The optical code reader 12 is illustrated with an integrated scale. The checkout clerk 38 stands or sits adjacent to the distal end 126 (the far or most distant end from the upper housing section 62), and away from bezel customer side 158, and moves items across the cover/platter 50. Read modules view items being moved past the view volumes of the windows 70a, 70b, and 68. Because the optical code reader 12 is on the side away from the checkout clerk 38, it is possible to provide a (preferably) small, upper housing section 62 to contain a read module behind windows 70a and 70b. Additional read modules may be provided at different positions along the upper housing section 62 or at other positions behind window 216.

The optical code reader 12 includes a lower housing section 64 that contains or otherwise supports all the electronics and optics components. FIG. 11 is an exploded isometric view of the optical code reader 12 with the cover/platter 50 removed. The lower housing section 64 is shown with portions of its internal cover removed in order to reveal internal components. The internal cover encloses the internal electronic and optical components and supports/contains the internal windows, namely the lower internal window 214.

The lower housing section 64 includes multiple (typically four) support post and load cell combinations, such as a checker side trailing post 602 and a checker side trailing load cell 604 (in the lower left hand corner), a checker side leading post 606 and a clerk side leading load cell 608 (in the lower right hand corner), a customer side leading post 610 and a customer side leading load cell 612 (in the upper right hand corner), and a customer side trailing post 614 and a customer side trailing load cell 616 (in the upper left hand corner). The entire weigh platter 50 rests on and engages the load cell posts 602, 606, 610, and 614.

Details of the optics and electronics of the lower housing section 64 are illustrated in FIG. 11. The customer side 36 of an item 20 with codes facing away from the checkout clerk 38 is primarily viewed by the folded imaging system comprising imager or sensor array 235 and lens system 230 (see FIG. 9), folding mirror 225, and windows 70, 216. The lens system and sensor array assembly 230/235 is mounted on a PCB 710. The view segment of this camera 230/235 is redirected or folded by the primary fold mirror 225. This imaging system's components may protrude above the top surface of lower window 68 because they are distant from the checkout clerk 38 and should not interfere with typical body motions of the checkout clerk 38. In alternative embodiments the camera(s) need not protrude above the work surface.

As previously described above with reference to FIG. 10, the optical code reader 12 of FIG. 11 is operative to view optical codes on items 20 which are facing either in the direction of travel 22 (leading side 30), or away from the direction of travel 22 (trailing side 32). For this functionality, a single imager 400 may be used whose field-of-view is split into two parts. This camera comprises the imager or sensor array 400 and lens system 405 (see FIG. 10), the folding mirror set 414, 412 and 410 and the folding mirror set 434, 432, and 430. Though shown schematically in FIG. 10, the sensor array 400 and the lens system 405 are not visible in FIG. 11 but comprise a camera assembly mounted on a PCB 750.

Depending on the layout of the optical code reader 12, the environment, or the arrangement of the store or checkout station 10, ambient lighting may be sufficient to provide adequate illumination. Although the imagers 235 and 400 may operate under ambient light conditions, the optical code reader 12 is preferably equipped with means for illuminating the field of view. The optical code reader 12 may have lighting modules for each of the fields of view. The light sources of the illumination system may comprise any suitable light source such as a row or array of LEDs (light emitting diodes) mounted in/on the upper housing section 62 and a row/array of LEDs mounted in/on the lower housing section 64 pointed into the view volume and positioned to illuminate the item 20 with respect to one or more perspectives. The LEDs may be disposed on the housing structure or may be mounted internally behind windows 68 and 70. Any suitable number of LED arrays may be employed.

For example, illumination modules 620 and 630 may be disposed behind window 216, one module on each side of the primary mirror 225 for illuminating the field of view for the imager 235. The window 216 may be a split window. The illumination modules 620 and 630 may include a four-part reflector array with one or more LEDs positioned to direct illumination into the field of view along a desired pathway. For example, the illumination module 620 has four reflector cones 620a, 620b, 620c, 620d, and the illumination module 630 has four reflector cones 630a, 630b, 630c, 630d. The reflector cones 630a-c have reflective inner surfaces operative to reflect and direct light from the one or more LEDs disposed in the base of the cone.

The illumination modules 620 and 630 may be alternately illuminated to mitigate the effects of specular reflection on a reflective item (for example, a metal soft drink can) such as by a method disclosed in U.S. Pat. No. 6,899,272, which is herein incorporated by reference.

The illumination modules 450, 460 are disposed behind window 214, with module 450 to one side of the primary mirror 414 for illuminating the field of view from the primary mirror 414 to the imager 400 and the module 460 to one side of the primary mirror 434 for illuminating the field of view from the primary mirror 434 to the imager 400. The illumination module 450, 460 may include a four-part reflector array (similar to that described for the illumination modules 620,630) with one or more LEDs positioned to direct illumination into the field of view along a desired pathway.

In some embodiments, different wavelengths of light are directed to illuminate different regions of an item for different perspectives. In some embodiments, the one or more of the light sources may be operated in a pulsed mode, the pulsing synchronized with the imager frame rate or a multiple thereof. In one example, the imagers may be selected with a frame rate of 30 Hz and one or more of the light sources used to illuminate the read region are pulsed at 60 Hz. Examples of light source pulsing is described in U.S. Pat. No. 7,234,641, herein incorporated by reference.

Electronics for the unit may be included on various printed circuit boards (PCBs) mounted and contained within the lower housing section 64 and the upper housing section 62. PCBs 700 and 720 may support among other elements, certain connectors, including a USB connector 702, a USB connector 704, RJ network connector 706, and a serial (e.g. camera link) connector 708.

More details and variations concerning low-profile optical code readers 12 and their components can be found in U.S.

Pat. No. 8,430,318, U.S. Prov. Pat. Appl. No. 61/657,634, and U.S. patent application Ser. No. 13/895,258, which are herein incorporated by reference. In addition to the variations and combinations previously presented, the various embodiments may advantageously employ lenses and light baffles, other arrangements, and/or image capture techniques disclosed in U.S. Pat. Pub. No. 2007/0297021, which is herein incorporated by reference. Further details of image processing including stitching and virtual line scan methods are described in U.S. Pat. Nos. 5,493,108 and 5,446,271, which are herein incorporated by reference. Exemplary imaging techniques are also described in detail in U.S. Pat. No. 8,269,868, which is herein incorporated by reference.

FIG. 12 is a block diagram of an EAS deactivation system for deactivating EAS tags. With reference to FIG. 12, in addition to the weigh scale, the checkout station 10 may include an EAS deactivation device 810 integrated with the optical code reader 12. The EAS deactivation device 810 defines a deactivation zone 830 in which an EAS tag 805 can be deactivated. The deactivation device 810 comprises a deactivator unit 812 and an energizing or power source unit 816. The deactivator unit 812 comprises one or more deactivating coils 814. The one or more deactivating coil(s) 814 may be positioned at a variety of different angles and positions depending on the shape of the deactivation zone 830 desired to be formed by the deactivation device 810. In preferred embodiments, the deactivation zone 830 may overlap some or all of the view volume or some or all of the cover/platter 50.

The coil(s) are adapted to transmit magnetic fields for altering the magnetic properties of an active EAS tag 805 placed in proximity to the coil(s) 814. The power source unit 816 controls the operation of the deactivation unit 812 in terms of energizing the deactivating coil(s) 14. The power source unit 816 is connected to the unit 812 by a cable and comprises a power generator 820 and a discharge switch 822 controlled via signal from a microprocessor 818.

The EAS deactivation system 810 is applicable to any type of EAS tags 805 such as magnetoacoustic, magnetomechanical, magnetostrictive, RF (e.g. RFID tag), microwave, and harmonic type tags. One example of an EAS tag 805 comprises a magnetostrictive amorphous element contained in an elongated housing in proximity to a control element which can be comprised of a biasing magnetizable material. EAS Tags 805 of this type are available from Sensormatic Electronics Corporation of Boca Raton, Fla. under the trademark Ultra*Max®. The characteristics and operation of certain EAS tags 805 is further described in U.S. Pat. No. 4,510,489, which is herein incorporated by reference.

During operation of the deactivation device 810, a microprocessor 818 receives an input signal over input line 840 indicating that an EAS tag 805 is present at the deactivation device 810 for deactivation. The signal may be generated by a suitable deactivator, such as the deactivator described in U.S. Pat. No. 5,341,125, which is herein incorporated by reference. Such deactivators include transmit/receive coils and associated processing circuitry (not shown) for detecting the presence of an EAS tag 805 in the deactivation zone 830 and furnishing the signal over line 840.

Upon receipt of the signal on line 840, the microprocessor 818 initiates a deactivating sequence for the deactivation device 810 by closing a discharge switch 822 that allows the output of a power generator 820 to be connected to the deactivating coil(s) 814. A current then flows in the first and second deactivating coil(s) 814 causing deactivating electromagnetic fields to be transmitted by the coil(s) 814 and a resultant deactivation field is formed in the deactivation zone 830. The resultant deactivation field establishes flux lines along the length of the magnetizable control element of the EAS tag 805, thereby demagnetizing the element.

Though the system and operational methods described herein are applicable to any suitable type of data reader and deactivation system, they are particularly applicable to integrated configurations. Various configurations for integrated data reader and EAS deactivation systems are disclosed in U.S. Pat. Nos. 7,374,092 and 7,619,527, which are herein incorporated by reference.

For example, in some embodiments, the deactivation coils 814 are disposed longitudinally along the travel direction 22 of the item 20, in the lower housing section 64 distal from the upper housing section 62 and next to the checkout clerk 38. Alternately, the deactivation coils 814 may be disposed on a lateral side of the lower window 68 downstream of the direction of scanning. In either configuration, or some other suitable configuration, the deactivation coil(s) 14 are integrated into the lower housing section 64 of the optical code reader 12 producing a deactivation field preferably at least partially coextensive with the view volume of the scanner. The deactivation coils 814 may alternatively or additionally be integrated into the upper housing section 62 of the optical code reader 12.

The deactivation coils 814 and some or all of the other components of the EAS deactivation system 810 may be integrated into a deactivation unit that comprises at least a central core of magnetically-active material (e.g. iron) with outer wire winding(s) (deactivation coils 814) through which current is passed to create the deactivating magnetic field. The housing for the deactivation coils 814 can be made of a variety of materials but is preferably injection molded from a non-magnetically active material such as polystyrene or polycarbonate. More details of an exemplary EAS system are discussed in U.S. Pat. No. 7,495,564, which is herein incorporated by reference.

As noted previously, the use of an enlarged nonmetallic bezel 80 permits the magnetic field strength requirement to be reduced, thereby allowing reduction in the size of the deactivation coils 814 and/or the amount of current sent through them. For example, the magnetic field employed by the EAS deactivation system 810 in conjunction with the nonmetallic bezel 80 can provide an EAS deactivation first swipe success rate of greater than 85%. In some embodiments, the EAS deactivation first swipe success rate of greater than 95%. In some embodiments, the EAS deactivation first swipe success rate of greater than 99%.

Though described primarily with respect to a checker-assisted optical code reader 12, the optical code readers 12 and methods described herein may be employed in a self-checkout system.

It is intended that subject matter disclosed in any portion herein can be combined with the subject matter of one or more of other portions disclosed herein as long as such combinations are not mutually exclusive or inoperable. In addition, many variations, enhancements, and modifications of the optical code reader concepts described herein are possible.

The terms and descriptions used above are set forth by way of illustration only and are not meant as limitations. Thus while certain preferred embodiments and applications have been shown and described, it will be apparent to those having skill in the art that many changes may be made to the details of the above-described embodiments without departing from the underlying principles of the invention(s). The scope of the invention(s) should, therefore, be determined only by the following claims.

The invention claimed is:

1. A cover for an optical code reader, comprising:
   a lower window having a horizontal perimeter;
   a metallic plate surrounding a portion of the horizontal perimeter of the lower window, wherein the metallic plate has a metallic plate surface reflectivity, and wherein the metallic plate has a distal end section and two side sections wherein the two side sections have separated distal end sections; and
   a nonmetallic bezel positioned between the separated distal end sections of the two side sections of the metallic plate, wherein the nonmetallic bezel comprises a nonmetallic material having a reflectivity is less than the metallic plate surface reflectivity, wherein the nonmetallic bezel has a bezel leading side, wherein the nonmetallic bezel has a bezel trailing side, wherein the nonmetallic bezel has a bezel checker side that is connected to the bezel leading and trailing sides, wherein the nonmetallic bezel has a bezel customer side that is connected to the bezel leading and trailing sides, and wherein the bezel customer side is longer than the bezel checker side, wherein the metallic plate and the bezel form a lower surface having a lower surface area, and wherein the bezel has a bezel surface area that is greater than or equal to 20% of the lower surface area.

2. A cover of claim 1, wherein the nonmetallic material has a reflectivity of less than 25%.

3. A cover of claim 1, wherein the nonmetallic material has a reflectivity of less than 15%.

4. A cover of claim 1, wherein the lower window has a lower window surface area, and wherein the bezel surface area is greater than or equal to 25% of the size of the lower surface area.

5. A cover of claim 1, wherein the bezel has a bezel surface area that is greater than or equal to 5000 mm$^2$.

6. A cover of claim 1, further comprising:
   a lower window central axis; and
   an upper surface positioned transversely to the lower window, the upper surface including a base, an upper window, and an upper surface central axis that intersects with the lower window central axis, wherein the bezel has a bezel central axis that is collinear with the lower window central axis, and wherein the bezel checker side along the bezel central axis is greater than or equal to two inches away from the base of the upper surface at an intersection of the lower window central axis and the upper surface central axis.

7. A cover of claim 1, further comprising:
   an upper surface positioned transversely to the lower window, wherein the upper surface has a nonlinear curvature, and wherein the bezel has a bezel edge that abuts the upper surface and matches the curvature of the upper surface.

8. A cover of claim 1, wherein the bezel customer side has a convex shape.

9. A cover of claim 1, wherein the lower window has a lower window central axis and a lower window width that is perpendicular to the lower window central axis, wherein the bezel has a bezel central axis that is collinear with or parallel to the lower window central axis, wherein the checker side is perpendicular to the bezel central axis, wherein the bezel customer side has a bezel customer side length that is greater than the lower window width.

10. A cover of claim 1, wherein the bezel has a bezel width between the bezel checker side and the bezel customer side, and wherein the bezel checker side has a checker side length that is greater than the bezel width.

11. A cover of claim 1, wherein the bezel checker side has a checker side length, wherein the bezel customer side has a customer side length, wherein the customer side length is longer than the checker side length, and wherein the customer side length is shorter than twice the checker side length.

12. A cover of claim 1, wherein the nonmetallic material has a Shore D value between 50-90.

13. A cover of claim 1, wherein the nonmetallic material comprises a thermoplastic elastomer.

14. A cover of claim 1, wherein the cover is a weigh platter of the optical code reader, and wherein the optical code reader has an electronic article surveillance deactivation system and load cell.

15. A cover of claim 1 wherein the separated proximal end sections of the metallic plate prevent formation of an electrically conductive loop around the horizontal perimeter of the lower window.

16. A cover of claim 1, further comprising:
   a nonmetallic spacer that is discrete from the bezel and positioned between the bezel and the lower window.

17. A cover of claim 1 forming part of a checkout station, wherein the checkout station includes a housing, a scale within the housing for weighing items at the checkout station and a cover, wherein the cover is supported by the scale, wherein the cover includes a lower surface that includes the lower window, wherein the cover includes an upper surface including an upper window positioned transversely to the lower surface, wherein the nonmetallic bezel is positioned between the lower window and the upper window, wherein the checkout station includes one or more imagers mounted within the housing for obtaining views of an item within a viewing volume bounded by the lower and upper surfaces of the cover; wherein the checkout station includes a surveillance tag deactivation system for deactivating an electronic surveillance tag in proximity to the viewing volume, wherein the nonmetallic material has a Shore D value between 40-100, wherein the nonmetallic material has a reflectivity of less than 25%, wherein the lower window has a lower window surface area, and wherein the bezel surface area is greater than or equal to 25% of the size of the lower surface area.

18. A method of operating a system for capturing images of an item and deactivating an electronic surveillance tag, comprising:
   illuminating a view volume bounded by a weigh platter having a lower surface, wherein the lower surface has a lower window, wherein the weigh platter includes a metallic plate that partly surrounds the lower window, wherein the metallic plate has a distal end section and two side sections wherein the two side sections have separated distal end sections, wherein the metallic plate has a metallic plate surface reflectivity, wherein the lower surface of the weigh platter includes a bezel positioned at least partly between the separated end sections of the metallic plate, wherein the bezel has a bezel surface reflectivity, and wherein the bezel surface reflectivity is less than the metallic plate surface reflectivity;
   viewing optical codes on items passing through the view volume above the weigh platter;
   employing one or more load cells to support the weigh platter to weigh one of the items placed onto the weigh platter; and
   employing an EAS deactivation system positioned beneath the weigh platter to deactivate a surveillance tag attached to one of the items as it is passed over the lower surface of the weigh platter.

19. A method of claim 18, wherein the bezel has a reflectivity of less than 15%.

20. A method of claim 18, wherein the bezel has a bezel surface area that is at least 20% of the total surface area of the lower surface.

21. A method of claim 18, wherein the bezel comprises a nonmetallic material.

22. A method of claim 18, wherein the weigh platter includes an upper surface including an upper window positioned transversely to the lower surface, wherein the bezel is positioned between the lower window and the upper window, wherein the bezel is formed from a nonmetallic material, wherein the nonmetallic material has a Shore D value between 40-100, wherein the lower window has a lower window surface area, and wherein the bezel surface area is greater than or equal to 25% of the lower surface area.

23. A method of claim 22, wherein the bezel has a bezel leading side, wherein the bezel has a bezel trailing side, wherein the bezel has a bezel checker side that is connected to the bezel leading and trailing sides, wherein the bezel has a bezel customer side that is connected to the bezel leading and trailing sides, wherein the bezel checker side has a checker side length, wherein the bezel customer side has a customer side length, and wherein the customer side length is longer than the checker side length.

24. A method of claim 22, wherein the lower window has a lower window central axis and a lower window width that is perpendicular to the lower window central axis, wherein the bezel has a bezel central axis that is collinear with or parallel to the lower window central axis, wherein the bezel has a bezel leading side, wherein the bezel has a bezel trailing side, wherein the bezel has a bezel checker side that is transverse to the bezel central axis and the bezel leading and trailing sides, wherein the bezel has a bezel customer side that is transverse to the bezel central axis and the bezel leading and trailing sides, and wherein the bezel customer side has a bezel customer side length that is greater than the lower window width.

25. A method of claim 22, wherein the upper surface has a nonlinear curvature, and wherein the bezel has a bezel edge that abuts the upper surface and matches the curvature of the upper surface.

26. A method of claim 22, wherein the lower window has a lower window central axis, wherein the upper surface includes a base, an upper window, and an upper surface central axis that intersects with the lower window central axis, wherein the bezel has a bezel central axis that is collinear with the lower window central axis, wherein the bezel has a bezel checker side and a bezel customer side, wherein the bezel customer side is closer to the upper surface than is the bezel checker side, and wherein the bezel checker side at a position aligned with the bezel central axis is greater than or equal to two inches away from the base of the upper surface at an intersection of the lower window central axis and the upper surface central axis.

27. A bezel for a cover in an optical code reader, comprising:
- a nonmetallic material having a reflectivity of less than 25% and a Shore D value between 40-100;
- a bezel leading side;
- a bezel trailing side;
- a bezel checker side that is connected to the bezel leading and trailing sides; and
- a bezel customer side that is connected to the bezel leading and trailing sides, wherein the bezel customer side is longer than the bezel checker side, and wherein the bezel customer side has a convex shape.

* * * * *

UNITED STATES PATENT AND TRADEMARK OFFICE
CERTIFICATE OF CORRECTION

| | |
|---|---|
| PATENT NO. | : 9,064,395 B2 |
| APPLICATION NO. | : 13/913034 |
| DATED | : June 23, 2015 |
| INVENTOR(S) | : Shearin et al. |

Page 1 of 1

It is certified that error appears in the above-identified patent and that said Letters Patent is hereby corrected as shown below:

In the specification

Column 16
Line 46 change "of" to --may be--.
Line 48 change "of" to --may be--.

Column 17
Line 13, after "reflectivity" insert --that--.

Signed and Sealed this
First Day of March, 2016

Michelle K. Lee
*Director of the United States Patent and Trademark Office*